Figure 1:
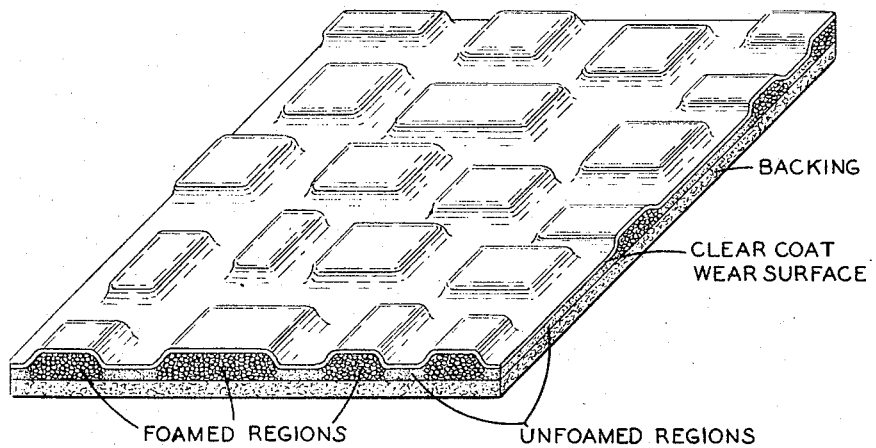

Jan. 23, 1968   J. H. WITMAN   3,365,353
CHEMICAL EMBOSSING OF FOAMED DECORATIVE
SURFACE COVERING
Filed May 11, 1965

INVENTOR
JACK H. WITMAN

BY *Theodore L. Thomas*

ATTORNEY 3,365,353
CHEMICAL EMBOSSING OF FOAMED
DECORATIVE SURFACE COVERING
Jack H. Witman, Lancaster, Pa., assignor to Armstrong Cork Company, Lancaster, Pa., a corporation of Pennsylvania
Filed May 11, 1965, Ser. No. 454,907
10 Claims. (Cl. 161—116)

This invention relates generally to a decorative surface covering, and more particularly to a decorative surface covering having a cellular or foamed structure. Still more particularly, the invention relates to a thermoplastic decorative surface covering having an embossed appearance achieved without the use of mechanical embossing.

The mechanical embossing of foamed or cellular sheets, in combination with printing, has always presented several problems. It has been difficult to achieve sharp edges and sharp lines of demarcation in the embossed areas when dealing with foamed structures. Where printing is carried out in addition to the embossing, the problem of attaining register between the embossing rolls and the printing rolls has been exceedingly difficult. The difficulty increases with the width of the embossed and printed sheet. Therefore there has been a need for an improved method of imparting an embossed appearance to the thermoplastic sheet.

It is the primary object of the present invention to supply such a need. It is still another object of the present invention to supply a chemical method of imparting an embossed appearance to a cellular sheet. It is still another object of the present invention to describe a method wherein the embossing and the printing on a decorative sheet coincide perfectly.

These objects are accomplished in a simple and effective manner. The invention contemplates imparting an embossed appearance to a thermoplastic sheet which comprises blending a vinyl resin, a plasticizer for the vinyl resin, a blowing agent which decomposes when heated at a temperature in the range above the glass transition temperature of the plasticized vinyl resin and below the decomposition temperature of the resin, and a polymerizable monomer compatible with the plasticized vinyl resin. This monomer must contain at least two olefinically unsaturated sites and be capable of addition polymerization at said temperature range in the presence of an addition polymerization catalyst. The above-described mixture is formed into a sheet. There is then applied to the resulting sheet in a predetermined pattern a composition comprising a liquid that will penetrate the sheet, and a catalyst that will cause polymerization of the monomer in the stated temperature range. Finally, the resulting sheet is heated to a temperature in the range of 300°–450° F. to fuse the plasticized resin, decompose the blowing agent, and polymerize the monomer.

Figure 2:
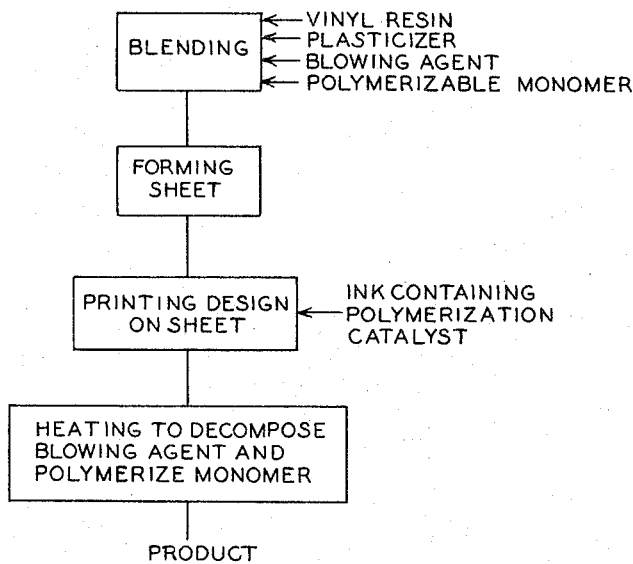

Referring to the drawings, which are self-explanatory,

FIG. 1 illustrates an enlarged section of a product of the present invention having a backing and a top clear coat, and FIG. 2 is a flow diagram illustrating the method of the present invention.

The thermoplastic resins useful in the present invention are those resins capable of forming films and sheets. Such resins will primarily comprise the polymers and copolymers of vinyl chloride. Poly(vinyl chloride) itself is the preferred resin, although copolymers of vinyl chloride with vinyl acetate, vinylidene chloride, other vinyl esters such as vinyl proprionate, vinyl butyrate, as well as alkyl substituted vinyl esters may be used. Vinyl chloride may also be copolymerized with any of a number of acrylic compounds such as acrylic acid and the esters thereof and the corresponding methacrylates. When unusually excellent properties of abrasion resistance, toughness, and tensile strength are not required, as may well be the case with a wall covering or other merely decorative application, other materials may be used as a thermoplastic resin. Examples of such materials will be polystyrene, substituted polystyrene, polyethylene, polypropylene, acrylic acid, alkyl acrylic esters, alkyl methacrylic esters, and the like. The thermoplastic resins are those formed by addition polymerization as opposed to the normally non-thermoplastic resins usually formed by condensation. The glass transition temperature of these resins is the temperature at which the resin changes from a hard, brittle solid to a flexible solid. Increasing plasticization of the resin increasingly lowers the glass transition temperature. As a practical matter, the glass transition temperature of the resin lies close to the initial gellation temperature of the resin dispersed in a plasticizer even though the initial gellation temperature is rate sensitive.

The thermoplastic resin, preferably poly(vinyl chloride) as described above, will be combined with a plasticizer for the resin in order that the resin may be formed into a sheet. A convenient method for making the sheet is to utilize a dispersion grade poly(vinyl chloride) resin and blend the resin with 20–130 parts by weight plasticizer per 100 parts by weight of the resin. The formation of a plastisol is a convenient means for forming a sheet from the thermoplastic resin. A plastisol is a mixture of a thermoplastic resin and a plasticizer therefor, the resin normally being distributed in the plasticizer in a kind of slurry. Suitable plasticizers are the ester type plasticizers such as dioctyl phthalate, dioctyl sebacate, dioctyl adipate, dioctyl azelate, in which the octyl group is frequently in the form of a 2-ethyl hexyl group. Other alkyl groups can be used in place of the octyl group to yield, for example, plasticizer such as dibutyl phthalate, dibutyl sebacate, dibutyl adipate, and the like. The phosphate esters are also useful, for example tricresyl phosphate. The viscosity of the plastisol will be controlled to some extent by selection of the particular plasticizer, the particular resin, and the amounts of each to be used. Hence a range of viscosities is available depending on how a sheet is to be formed from the plastisol.

The blowing agent must be thoroughly distributed throughout the resin-plasticizer mixture. A variety of blowing agents is available on the market for incorporation in thermoplastic resins. The preferred blowing agent for poly(vinyl chloride) is azobisformamide which normally decomposes at a temperature of about 390° F. in air. This blowing agent is particularly suitable for use in the method of the present invention in view of its relatively high decomposition temperature. The following table shows other usable blowing agents with the temperature at which they release gas vigorously in dioctyl phthalate:

| Blowing agent: | Temperature, ° F. |
|---|---|
| Azobisisobutyronitrile | 240 |
| N,N'-dimethyl-N,N'-dinitrosoterephthalamide | 220 |
| p,p'-Oxybis (benzenesulfonylhydrazide) | 320 |
| p,p'-Oxybis (benzenesulfonylsemicarbazide) | 425 |
| Barium azodicarboxylate | above 480 |
| Dinitrosopentamethylenetetramine (80%) | 370 |

The usable blowing agents will generally comprise the substituted hydrazides, substituted azo compounds, and substituted nitroso compounds. The blowing agent will normally be present in an amount in the range of about 0.5%–15% based on the weight of the thermoplastic resin. As a general rule, the preferred minimum decomposition temperature of the blowing agent should be about 300° F., and the blowing agent should decompose below the decomposition temperature of the resin, which in the case of poly(vinyl chloride) would be about 400° F. However, stabilized vinyl resin composition will normally not decompose until even higher temperatures—approaching 450° F.—are reached.

The fourth critical component of the composition is the polymerizable monomer. This monomer must have at least two olefinically unsaturated sites in its molecule. Not only does the monomer polymerize under the conditions to be described below, but it will also apparently cause crosslinking of the poly(vinyl chloride) chains. Since it is postulated that crosslinking occurs to a significant extent during the present process, it is necessary that the polymerizable monomers have more than one polymerizing site. At the same time, the monomer must be compatible with the vinyl resin, that is, it must be miscible therewith and be capable of being intimately dispersed therein instead of ocupying discrete volumes in the plastisol. Examples of usable polymerizable monomers are the di and tri acrylates and dimethacrylates prepared by the esterification of glycols with acrylic acid and methacrylic acid. Monoacrylates and methacrylates are usable where the esterifying portion of the alcohol itself contains an olefinically unsaturated bond, as is the case in allyl acrylates. Dicarboxylic acids may be esterified with unsaturated alcohol to produce such usable monomers as diallyl fumarate. Diolefinically unsaturated hydrocarbons such as divinyl benzenes, divinyl toluene, and the like also function to polymerize and to cross link in the present process. As used herein, the term monomer means a compound of relatively low molecular weight compared with the polymers it forms. As emphasized above, the only requirement for this polymerizable monomer is that it be compatible with the plastisol system and that it have two olefinically unsaturated sites in the molecule which will allow the compound to polymerize under the conditions of temperature and catalyst to be described below. The polymerizable monomer, depending on the composition, will generally be present in the range of about 3%–35% by weight based on the weight of the thermoplastic resin.

To these four critical ingredients, the resin, the plasticizer, the blowing agent, and the polymerizable monomer, there may be added additional ingredients such as pigments, dyes, or other decorative elements to the composition to be formed into the sheet. Depending on the material used and the intensity of the color desired, the amounts of such extra additives will normally range from a small fraction of a percent to 20% by weight of the total composition. Relatively small amounts of a granular filler such as a clay, a limestone, or a silicate may be used. However, the composition will not be highly filled in view of a need for at least a portion of the composition to expand and form a cellular or foamed region. Fillers to be used, if any, will normally be present in less than about 20% by weight of the total composition. Small amounts of heat and light stabilizers will also be incorporated. These are known in the art and may comprise the barium-cadmium salts of long-chain fatty acids, polyols such as pentaerythritol or alpha-methylglucoside, nitrogen compounds such as melamine or dicyandiamide, esters such as phenyl phthalate, phenyl benzoate, o-toluol benzoate, triethylene glycol salicylates, certain of the organic phosphates, and mixtures thereof. Such stabilizers will not normally be present in amounts greater than about 3% by weight of the total composition.

The several ingredients will be blended to achieve thorough distribution of one in the other in customary manner well known in the art. After thorough mixing has been achieved, the plastisol is formed into a sheet.

The plastisol may be doctored, roll coated, or otherwise applied to a backing or to a strippable carrier which may be a steel belt, a rubber belt, paper, or a felt having a release coat thereon. Application of relatively gentle heat to the plastisol causes a low degree of fusion and thus gels and slightly sets the sheet so it may be removed or otherwise handled for further treatment. The amount of heat applied at this stage of the process is insufficient to decompose the blowing agent. The plastisol will often be applied directly onto a backing which is to become a permanent part of a surface covering. The backing will be one suitable for use as a surface covering, for example, a felt, preferably a rubber-bonded asbestos backing, a vinyl sheet backing, a cellulosic felt or other backing which lends itself to surface covering applications.

Instead of a plastisol, an organosol may be used in which an organic solvent is added to the resin-plasticizer mixture. The addition of such solvents is a further control in the viscosity of the fluid, and such solvents as the ketones, for example, methyl ethyl ketone nad methyl isobutyl ketone, may be used. Hydrocarbon aromatic solvents may be used, for example toluene and xylene. Aliphatics may be used such as are obtained in certain cuts from fractionation of hydrocarbon mixtures used in the oil industry. A disadvantage, however, of using an organosol instead of a straight plastisol in the present process is that the solvent will be driven off during the incipient gelation stage and must either be recovered or otherwise removed from the sphere of operations when heat is applied to the organosol.

The process so far has produced a thermoplastic sheet which will normally have at this stage of the process a thickness in the range of about 0.01 to 0.15 inch, exclusive of any backing. The sheet will contain thoroughly distributed therein a blowing agent in condition to liberate gas when sufficient heat has been applied to the sheet, and a polymerizable monomer in condition to be polymerized on the application of a catalyst and the same degree of heat that will liberate gas from the blowing agent. The crux of the present invention lies in applying in a predetermined pattern to the above-described sheet a catalyst which will lower the polymerizing temperature of the polymerizable monomer. Subsequent application of heat to decompose the blowing agent will also polymerize the monomer only in those areas to which the catalyst has been applied. Stated another way, the sheet is treated in certain areas with a compound which enhances polymerization of the polymerizable monomer, and which allows the polymerizable monomer to polymerize at temperatures substantially lower than is the case with the monomer which has not been so treated with a catalyst.

These catalysts are the known free radical catalysts widely used to enhance polymerization of olefinically unsaturated compounds. They comprise primarily the organic per-compounds. Among the peroxides that are usable are di-t-butyl peroxide, benzoyl peroxide, lauroyl peroxide, capryloyl peroxide, acetyl peroxide, p-chlorobenzoyl peroxide, cumene hydroperoxide, and the other known peroxide initiators. Large numbers of such peroxides exist, and generally they are broken down into broader groups comprising low-temperature types, intermediate-temperature types, and high-temperature types. The high-temperature types are those generally used above 212° F. Other per-compounds such as t-butyl perbenzoate, and isopropylpercarbonate are usable in the present process. Besides the per-compound type of free-radical initiators, there may be used such aliphatic azocatalysts as alpha,alpha'-azodiisobutyronitrile.

In order that the initiator or free-radical catalyst may achieve penetration into the sheet, it should be mixed with a liquid that will penetrate the sheet and thus will carry the catalyst into the sheet where it will be available to and in contact with the polymerizable monomer. This carrier liquid with which the catalysts are blended is preferably a diluent, solvent, or plasticizer for the particular resin in the plastic sheet. For example, a mixture of methyl ethyl ketone and dioxane serves as an excellent carrier for many of these initiators. The liquid chosen should be such that the initiator is soluble therein, or at least partly soluble therein, in order that maximum contact be established between the catalyst and the polymerizable monomer distributed throughout the plastic sheet. Where the catalyst is soluble in plasticizers such as tributoxy ethyl phosphite, then the plasticizers may serve as carriers for the catalyst. The solution of carrier liquid and catalyst is applied in a predetermined pattern to the thermoplastic sheet described above. Penetration of the liquid into the sheet brings the catalyst into contact with the polymerizable monomer. Sufficient heat is then applied to the treated sheet to raise the temperature of the sheet above the temperature at which the blowing agent will release gas and at which catalyzed monomer will polymerize.

Application of the carrier liquid containing the catalyst may be carried out in any convenient manner. The liquid may in fact be used as a printing ink and may also contain dyes, pigments, filler, wetting agent, stabilizer, and other compounds normally found in an ink. Such a colored ink, when printed on an above-described thermoplastic sheet by any of the known printing methods, will produce a colored design or pattern printed on the sheet. Subsequent application of heat as described earlier will then produce foaming in only those areas which have not been contacted with this ink. The polymerization which takes place with the polymerizable monomer in those areas where the catalyst-containing ink has been applied will inhibit foaming, apparently by drastically increasing the viscosity of those particular areas. The viscosity increase is due not only to the polymerization of the polymerizable monomer, but also apparently due to crosslinking of the growing polymer chains produced by the monomer and the chains of the vinyl resin itself. The evidence for crosslinking comes from solubility data of the foamed areas compared with the non-foamed areas. The foamed areas of a sheet prepared as described above are all soluble in tetrahydrofuran, while the unfoamed areas containing the polymerized monomer are insoluble in tetrahydrofuran.

As mentioned above, the areas printed with a catalyst-containing ink will be unfoamed to the desired extent, while the remaining areas containing the monomer but not containing the catalyst will be foamed. Use of larger or smaller amounts of catalyst, or more or less active catalyst, serve to control the extent of foaming allowed in the printed areas, thus achieving multi-level embossing, if desired. It is also possible to print those areas which will be foamed with an ink which does not contain the catalyst. These inks, both catalyst-containing and without the catalyst, will be printed in the thicknesses normally used in laying down the pigmented ink film. They generally will range in thickness from about 0.1 mil to about 20 mils, depending on the ability of the liquid carrier to penetrate the thermoplastic sheet and on the concentration of the catalyst in the liquid carrier. Depending on the activity of the particular catalyst selected, the concentration of the catalyst in the ink will generally run in the range of about 3%–25% by weight of the total weight of the ink.

Where the surface covering prepared by the present process is to be used as a floor covering, an additional wearing surface may be applied over the entire system prior to the final heating step which will bring about the foaming and polymerization. Once the composition containing the catalyst has been applied in a decorative pattern on the surface of the thermoplastic sheet, the sheet may be dried without causing foaming by the application of gentle heat.

A clear or colored coating of a thermoplastic resin may then be sprayed, doctored, or roll applied over the entire sheet in known manner. This final coating may contain a flatting agent to control gloss. Such coating may consist of a plastisol or organosol; it normally will have little pigment or filler therein. This clear coat will be the final coat and will overlay any printing which has previously been applied to the thermoplastic sheet. On the application of heat to cause fusion of the resin, decomposition of the blowing agent, and polymerization of the monomer, the clear coat will also fuse and become an integral part of the system covering both the raised foam areas and the low unfoamed areas on the sheet.

The following examples illustrate several embodiments of the invention. All parts are by weight unless otherwise stated.

*Example 1*

The following plastisol was prepared by thoroughly mixing the following ingredients in a Sunbeam Mixmaster mixer.

| Ingredients: | Parts |
|---|---|
| Poly(vinyl chloride) | 100 |
| Dioctyl phthalate | 32 |
| 1,3-butylene glycol dimethacrylate | 15 |
| Azodicarbonamide (1:1 in dioctyl phthalate) | 6 |
| Titanium dioxide (1:1 in dioctyl phthalate) | 10 |
| Epoxidized soya oil | 5 |
| Calcium-zinc soap stabilizer | 4 |

The above plastisol was applied on a beater saturated asbestos sheet backing having a thickness of 0.034 inch. The plastisol was applied with a Bird Blade in a wet thickness of 12 mils. The plastisol-coated backing was gelled in an oven for 4 minutes at 250° F.

An ink was prepared by mixing the solution containing 40% solids of methyl methacrylate and ethyl acrylate in an amount of 37.5 parts, plus 15 parts of benzoyl peroxide and 70 parts of a 1:6 mixture of methyl ethyl ketone and dioxane. This ink was applied in a series of alternate blocks (alternate blocks having no ink) by offset printing to the gelled plastisol sheet described above. The ink was dried by subjecting the printed sheet to an oven treatment for 7 seconds at 250° F.

The printed sheet was fused and expanded by placing the sheet in an oven maintained at 370° F. for 6 minutes. The printed areas did not expand and showed on close inspection of a cross section of the printed area merely a few minute pores. The unprinted areas, however, expanded in a normal manner producing a fairly homogeneous cellular structure. The thickness of the expanded structure was approximately twice that of the unexpanded structure. Hence the appearance of the final specimen was that of an embossed sheet.

*Example 2*

Example 1 was repeated wherein the 100 parts by weight poly(vinyl chloride) resin was substituted with 90 parts by weight vinyl chloride-vinyl acetate copolymer containing 13% by weight vinyl acetate (Geon 135) and with 10 parts by weight of a poly(vinyl chloride) blending resin (VR–10).

An embossed sheet resulted as with the poly(vinyl chloride) of Example 1.

*Example 3*

An organosol having the following formula was prepared:

| Ingredients: | Parts |
|---|---|
| Poly(vinyl chloride) | 100 |
| Dioctyl phthalate | 25 |
| Epoxidized soya oil | 4.5 |
| Barium-cadmium phosphite and calcium-zinc soaps | 3 |
| Polyethylene glycol monolaurate (viscosity control) | 2 |
| Mineral spirits: aliphatic hydrocarbon fraction (Solvesso 150), 3:1 | 12 |

The organosol was applied as a final coat to a sheet printed as in Example 1. Expansion was carried out in the same manner as in Example 1.

The resulting foam structure had the same appearance as the sheet in Example 1, the top coating serving as a wear coating.

Example 4

A series of 8 specimens was prepared using the process and the plastisol formulation of Example 1 except for the fact that the relative amount of the dioctyl phthalate and the 1,3-butylene glycol dimethacrylate was varied in accordance with the following table:

| Ingredient | 1 | 2 | 3 | 4 | 5 | 6 | 7 | 8 |
|---|---|---|---|---|---|---|---|---|
| Dioctyl phthalate | 40.0 | 37.0 | 34.5 | 29.5 | 27.0 | 37.0 | 42.0 | 22 |
| Dimethacrylate monomer | 7.0 | 10.0 | 12.5 | 17.5 | 20.0 | 15.0 | 15.0 | 25 |

In all cases, a sheet having an embossed appearance resulted.

In addition, the formulation of the plastisol in Example 1 was twice repeated using the following amounts of dioctyl phthalate and, as the polymerizable monomer, trimethylol propane trimethacrylate.

| Ingredients | Run 1 | Run 2 |
|---|---|---|
| Dioctyl phthalate | 40.0 | 22.0 |
| Trimethacrylate monomer | 7.0 | 25.0 |

Both formulations produced in the finished sheet an embossed appearance comparable to that produced in this Example 3 at the corresponding monomer:dioctyl phthalate content.

Example 5

A series of runs was made using the formulation of Example 1 save that in place of the 1,3-butylene glycol dimethacrylate as the polymerizable monomer there was used in each run in the same amount each of the following polymerizable monomers:

Ethylene glycol dimethacrylate
Diallyl fumarate
Tetraethylene glycol dimethacrylate
Methacryloxy-hydroxy triglyceride (Stapon Monomer 111)
Polymerizing plasticizer (Santoset 1, supplied by Monsanto Chemical Company)
Allyl acrylate
Di-vinyl benzene All of these monomers produced the embossed effect on the plastisol after printing and heating in the usual manner. The embossed effect was less pronounced with the diallyl fumarate, the methacryloxy-hydroxy triglyceride, and allyl acrylate, the di-vinyl benzene, and the polymerizing plasticizer.

Example 6

A series of inks was prepared using a free-radical initiator plus the acrylate binder system as described in Example 1 plus a solvent system as the carrier liquid. The formula of the inks in this series was:

| Ingredients: | Parts |
|---|---|
| Binder system | 15 |
| Initiator | 15 |
| Carrier liquid (MEK:Dioxane, 1:6) | 70 |

The following initiators were used in preparing the individual inks:

Lauroyl peroxide
t-Butyl perbenzoate
Azodiisobutyronitrile
Di-cumyl peroxide

When these inks were used as described in Example 1, the embossed effect was produced. Of these catalysts, the di-cumyl peroxide produced the least effect, that is, its use allowed the most pronounced cellular structure to form in the printed region, although the structure was still not as deep as was the structure in the unprinted areas. Thus the sheet produced by the use of the di-cumyl peroxide was more resilient over its entire surface than any of the other sheets.

Another ink of the following formulations was made:

| Ingredients: | Parts |
|---|---|
| Methyl methacrylate-ethyl acrylate copolymer (40% in toluol) | 20 |
| Benzoyl peroxide:dibutyl phthalate (58:42) | 21 |
| Finely divided silica flatting agent | 8 |
| Dioxane | 20.4 |
| Methyl ethyl ketone | 10.2 |
| Methyl isobutyl ketone | 10.2 |
| Isophorone | 10.2 |

When this ink was printed on a sheet prepared as described in Example 1, followed by the usual drying and heating, an excellent sheet having a pronounced effect was produced.

I claim:

1. The method of imparting an embossed appearance to a thermoplastic sheet which comprises blending
   (1) a vinyl resin,
   (2) a plasticizer for said vinyl resin,
   (3) a blowing agent which decomposes when heated at a temperature in the range above the glass transition temperature of the plasticized vinyl resin and below the decomposition temperature of said resin, and
   (4) a monomer compatible with the plasticized vinyl resin and containing at least two olefinically unsaturated sites and capable of addition polymerization at said temperature range in the presence of an addition polymerization catalyst,
   forming said blend into a sheet, applying to said sheet in a predetermined pattern a composition comprising
   (a) a liquid that will penetrate said sheet, and
   (b) a catalyst that will cause polymerization of said monomer in said temperature range,
   and heating the resulting sheet to a temperature in the range of about 300°–450° F. to fuse said plasticized resin, decompose said blowing agent, and polymerize said monomer.

2. A method according to claim 1 wherein said vinyl resin comprises poly(vinyl chloride).

3. A method according to claim 1 wherein said monomer comprises trimethylol propane trimethacrylate.

4. A method according to claim 1 wherein said monomer comprises 1,3-butylene dimethacrylate.

5. A method according to claim 1 wherein said catalyst comprises lauroyl peroxide.

6. A method according to claim 1 wherein said catalyst comprises benzoyl peroxide.

7. A method according to claim 1 wherein said liquid that penetrates said sheet comprises a plasticizer for said vinyl resin.

8. A method according to claim 1 wherein said liquid that penetrates said sheet comprises a solvent for said vinyl resin.

9. The method of imparting an embossed appearance to a thermoplastic sheet which comprises blending
   (1) a vinyl resin,
   (2) a plasticizer for said vinyl resin,
   (3) a blowing agent which decomposes when heated at a temperature in the range above the glass transition temperature of the plasticized vinyl resin and below the decomposition temperature of said resin, and
   (4) a monomer compatible with the plasticized vinyl resin and containing at least two olefinically unsaturated sites and capable of addition polymerization at said temperature range in the presence of an addition polymerization catalyst, forming said blend into a sheet, applying to said sheet in a predetermined pattern a composition capable of penetrating said sheet comprising a catalyst that will cause polymerization of said monomer in said temperature range, and heating the resulting sheet to a temperature in the range of about 300°–450° F. to fuse said plasticized resin, decompose said blowing agent, and polymerize said monomer.

10. The product of the method of claim 1.

References Cited
UNITED STATES PATENTS

| | | | |
|---|---|---|---|
| 2,920,977 | 1/1960 | Adams | 264—47 XR |
| 3,293,094 | 12/1966 | Nairn et al. | 264—47 XR |
| 3,293,108 | 12/1966 | Nairn et al. | 264—47 XR |

ALEXANDER H. BRODMERKEL, *Primary Examiner.*

P. E. ANDERSON, *Examiner.*